United States Patent [19]

Sasson

[11] Patent Number: 4,695,874
[45] Date of Patent: Sep. 22, 1987

[54] APPARATUS FOR PROCESSING A TIME-DIVISION MULTIPLEX VIDEO SIGNAL HAVING SIGNAL DURATIONS DIVISIBLE BY THE SAME NUMBER

[75] Inventor: Steven J. Sasson, Springwater, N.Y.

[73] Assignee: Eastman Kodak Company, Rochester, N.Y.

[21] Appl. No.: 793,820

[22] Filed: Nov. 1, 1985

[51] Int. Cl.⁴ ............................................. H04N 9/64
[52] U.S. Cl. ................................. 358/21 R; 358/11; 358/13
[58] Field of Search ............... 358/13, 21 R, 11, 12, 358/310, 320; 360/32

[56] References Cited

U.S. PATENT DOCUMENTS

| | | | |
|---|---|---|---|
| 4,127,865 | 11/1978 | Poetsch | 358/12 |
| 4,355,324 | 10/1982 | Reitmeier | 358/312 |
| 4,429,334 | 1/1984 | Hashimoto et al. | 358/310 |
| 4,438,452 | 3/1984 | Powers | 358/13 |
| 4,463,387 | 7/1984 | Hashimoto et al. | 358/310 |
| 4,516,150 | 5/1985 | Gurley | 358/13 |
| 4,574,302 | 3/1986 | Mackereth | 358/12 |
| 4,654,696 | 3/1987 | Dayton et al. | 358/11 |

FOREIGN PATENT DOCUMENTS 2144300  3/1985  United Kingdom ................ 358/12

OTHER PUBLICATIONS

Grob, Bernard "Basic Television and Video Systems" Fifth Edition McGraw-Hill Book Company, pp. 142-145.

Primary Examiner—James J. Groody
Assistant Examiner—David E. Harvey
Attorney, Agent, or Firm—William F. Noval

[57] ABSTRACT

A video signal apparatus processes a time-division-multiplex (TDM) video signal. The TDM signal includes a compressed sync, a compressed chrominance component constituting a series of time compressed samples of a chrominance component of a color video signal, a compressed luminance component constituting a series of time compressed samples of a luminance component of the color video signal and a buffer between the compressed chrominance component and compressed luminance component. The durations of each of the compressed sync, the compressed chrominance component, the compressed luminance component and the buffer are divisible by the same number (preferably an integral number) greater than one in order to reduce the speed, cost and complexity of timing and control circuitry.

7 Claims, 14 Drawing Figures

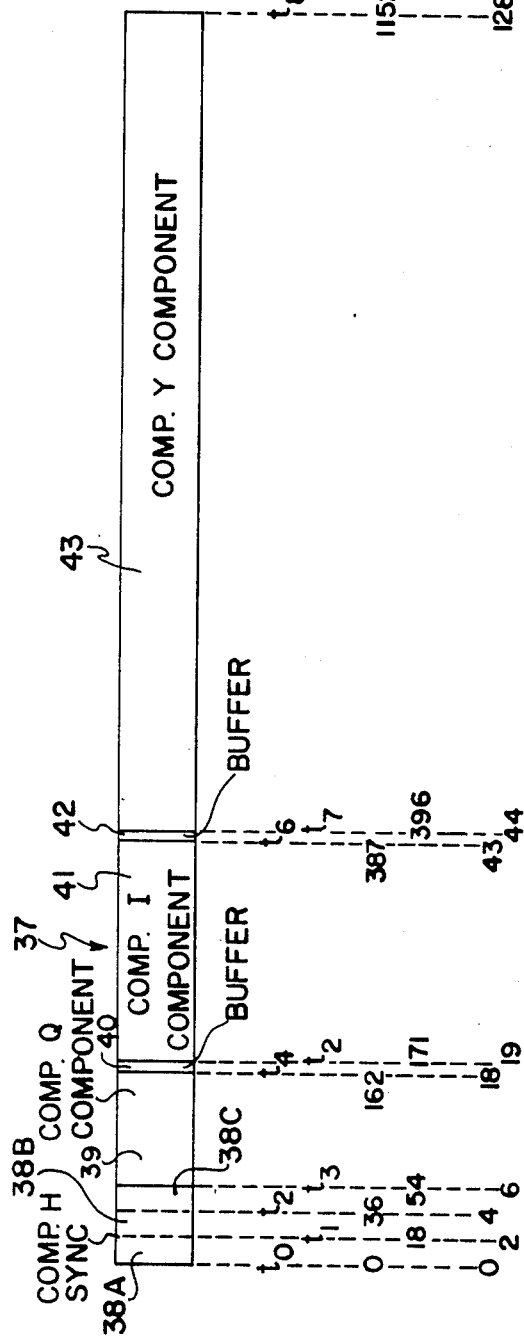
FIG. 6A
FIG. 6B
FIG. 6C
FIG. 6D
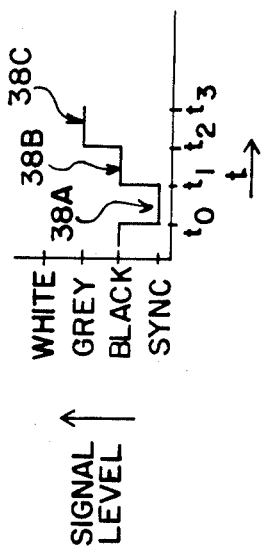
FIG. 8

APPARATUS FOR PROCESSING A TIME-DIVISION MULTIPLEX VIDEO SIGNAL HAVING SIGNAL DURATIONS DIVISIBLE BY THE SAME NUMBER

BACKGROUND OF THE INVENTION

In general, this invention relates to apparatus for processing video signals. More particularly, this invention relates to apparatus for processing time division multiplex (TDM) video signals in which the signal durations of the TDM video signal are divisible by a common number greater than one to reduce circuit cost and complexity.

In the consumer video cassette recorder (VCR) field, it is common to separate the chrominance and luminance signals in a frequency fashion in order to eliminate time base errors which result in reproduced color inaccuracies. In addition, the bandwidths of the luminance and chrominance signals are usually limited in order to reduce the cost and complexity of the VCR equipment. However, the conventional "color-under" formats used in consumer VCRs have certain problems. First, the "color-under" amplitude modulated chrominance signal is subject to noise interference worsening the signal to noise ratio of the recorded signal. Moreover, the "color-under" chrominance signal is subject to errors in burst gating and regeneration of the color subcarrier frequency used in standard composite color video broadcast signals used in television sets. Moreover, the reduced bandwidth of both the chrominance and luminance component signals in the "color-under" format limits the use of such a format in a higher resolution, higher image quality mode which utilizes substantially the full bandwidths of the standard broadcast color video signal.

It has been proposed in commonly-assigned copending U.S. patent application Ser. No. 725,873, by Carl Schauffele, entitled VIDEO REPRODUCTION APPARATUS, to provide a bi-modal video cassette recorder which is selectively operable in a conventional "color-under" mode at reduced signal bandwidth and in a high resolution time-division-multiplex mode at greater signal bandwidth. As disclosed in this patent application, in the high resolution mode, both the luminance and chrominance components of a color video signal are recorded at substantially full broadcast bandwidths for increased image resolution. In addition, the luminance and chrominance components are recorded at separate times, therefore eliminating time base error problems which might result in color inaccuracies in a reproduced television picture. Since the entire TDM signal is modulated on a frequency modulated carrier, the difficulties encountered in the amplitude modulated "color-under" chrominance signal are eliminated and the signal to noise ratio for both the chrominance and luminance signals are increased.

In such a time division multiplex video signal recording and playback apparatus, there is a need to simplify the equipment circuitry and minimize the cost thereof. Since the video components of the TDM signal are sampled at a high frequency in order to compress the components into a single video line and in order to utilize the full component bandwidths, high speed counting circuitry is used for timing and control in processing the TDM signal.

SUMMARY OF THE INVENTION

The present invention provides a solution to the timing and control problems in processing a time division multiplex video signal using a high sampling frequency to compress the video components. According to the present invention, circuit means are provided for producing from a component or composite video signal a TDM video signal including a compressed sync, a compressed luminance component, a compressed chrominance component and a buffer between the compressed luminance and compressed chrominance components. The respective durations of the sync, luminance component, chrominance component and buffer are divisible by the same number greater than one so that slower, simpler and less costly timing and control components and circuitry are used.

DESCRIPTION OF THE DRAWINGS

In the detailed description of the embodiment of the invention presented below, reference is made to the accompanying drawings in which like elements are numbered with like numbers.

FIG. 6A is a schematic representation of the TDM signal processed by the apparatus of FIG. 1;

FIGS. 6B, 6C, and 6D are respectively timing diagrams illustrative of the processing of the TDM signal represented in FIG. 6A;

FIG. 8 is a voltage versus time diagram of the compressed sync signal of the TDM video signal of FIG. 6A.

DESCRIPTION OF THE PREFERRED EMBODIMENT

Figure 1:
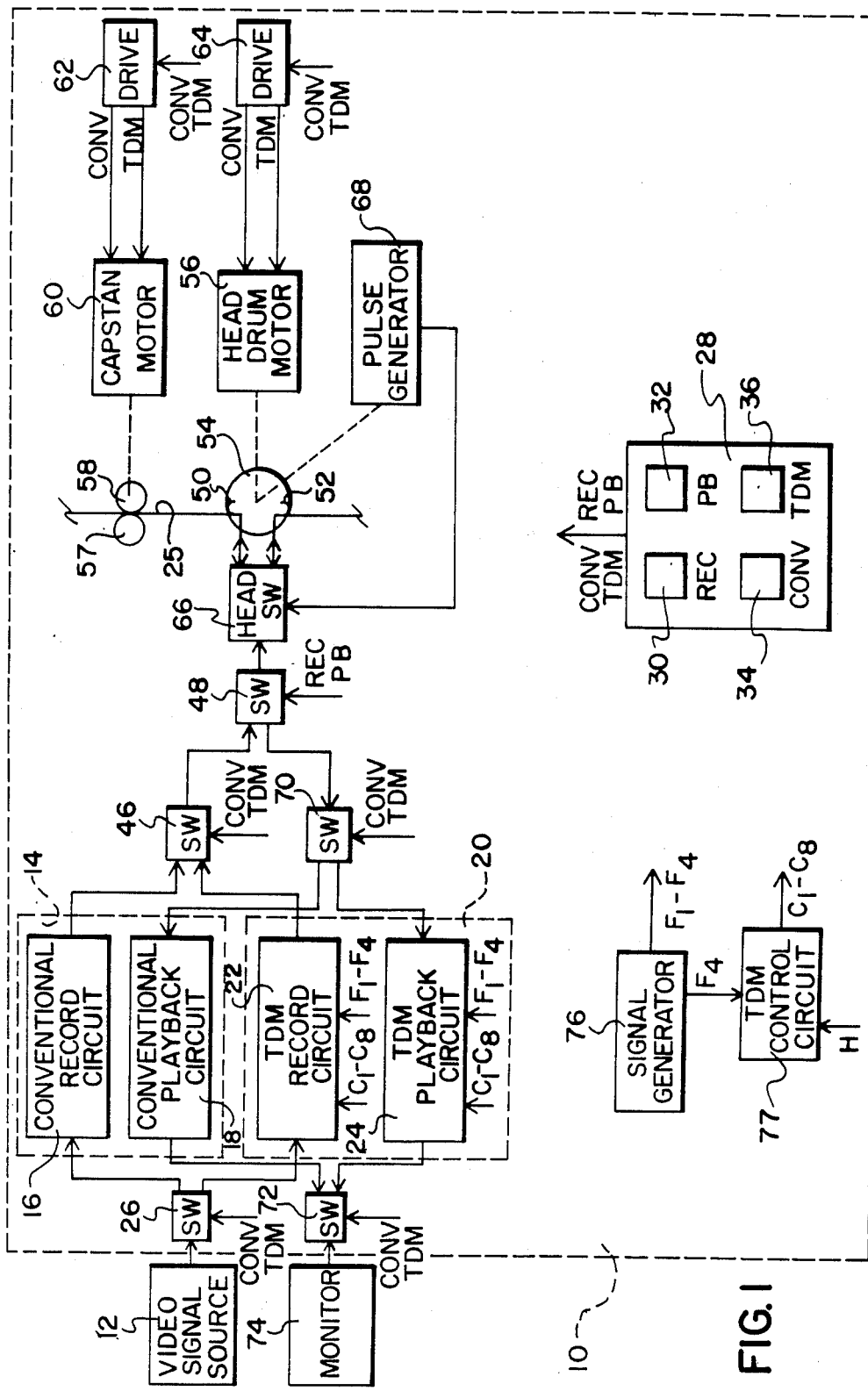
FIG. 1 is a block diagram of a video cassette recorder/player embodying video signal apparatus according to the present invention.

Referring now to FIG. 1, there is shown a block diagram of video cassette recorder (VCR) 10 including a preferred embodiment of the present invention. VCR 10 is operable in a first, conventional formate mode, and a second high-resolution TDM format mode. In the following description, it will be assumed that a standard NTSC composite color video signal used in the U.S. is processed by the apparatus of FIG. 1. It will be appreciated, however, that other composite video signal systems such as the PAL and SECAM systems used in Europe may also be processed thereby. It will also be appreciated that component video signals such as YIQ component color video signal, Y, R-Y, B-Y component color video signal, or RGB component signal may also be processed by the disclosed apparatus. In the NTSC system, approximately thirty frames of color information are transmitted each second, with each frame comprising two interlaced fields. The composite video signal includes a luminance signal which is amplitude modulated on a carrier signal and which has a bandwidth of approximately 4.2 MHz. The NTSC signal also includes I and Q chrominance signals amplitude modulated in quadrature on a subcarrier which has a frequency approximately 3.58 MHz higher than the carrier frequency. The I chrominance signal has a bandwidth of approximately 1.3 MHz and the Q chrominance signal has a bandwidth of approximately 0.5 MHz. A separate audio carrier is located 4.5 MHz from the picture carrier.

As shown in FIG. 1, a composite color video signal is presented to VCR apparatus 10 from video signal source 12 such as a camera, or cable, broadcast or satellite transmission. If source 12 is a camera, apparatus 10 may be combined therewith into a unitary hand-held unit (camcorder). Source 12 may include a tuner/detector to convert an r.f. signal into a composite video signal. Apparatus 10 includes a conventional format circuit 14 having conventional record circuit 16 and conventional playback circuit 18 and a high resolution TDM format circuit 20 having TDM record circuit 22 (FIG. 4) and TDM playback circuit 24 (FIG. 5).

Figure 3A:
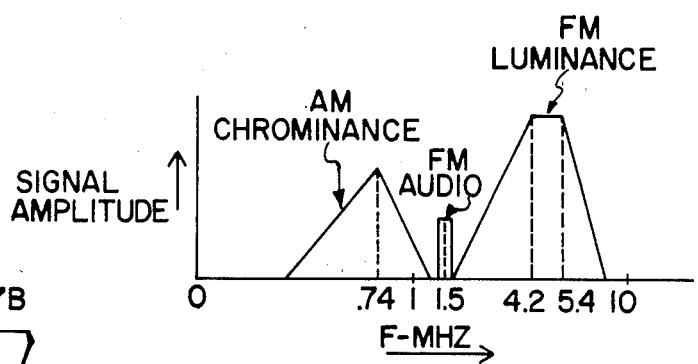
FIGS. 3A, 3B, and 3C respectively show frequency spectrum diagrams of conventional format, TDM format and NTSC composite video format.

A composite video signal from source 12 is applied by means of switch 26 to either conventional record circuit 16 or to TDM record circuit 22. Switch 26 is actuated by a signal from control 28 which has "REC" (record) button 30, "PB" (playback) button 32, "CONV" (conventional) button 34 and "TDM" (time-division multiplex) button 36, among others (not shown). For the present description, the conventional format will be described as that used in the KODAVISION 2400 Camcorder sold by the Eastman Kodak Company of Rochester, N.Y. The KODAVISION Camcorder is an integrated camera and tape recorder which uses 8 mm format video cassettes. The color video signal recorded on the tape is in a "color under" format in which the amplitude modulated luminance signal is modulated on a carrier so as to produce a signal having a bandwidth of approximately 2.5 MHz. The amplitude modulated chrominance signal is converted from a 3.58 MHz subcarrier frequency to a lower carrier frequency of 743.5 Khz, thereby to produce a signal having a bandwidth of about 0.5 MHz. The frequency modulated audio signal is converted from a 4.5 MHz carrier to a 1.5 MHz carrier and recorded with the same heads as the video signals. The frequency spectrum of the conventional 8 mm format recorded signal is shown in FIG. 3A.

Figure 2A:
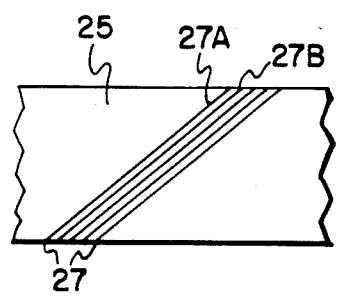
FIGS. 2A and 2B are diagrammatic partial views of video tape illustrating the modes of operation of the apparatus of FIG. 1.

The KODAVISION 2400 Camcorder has two magnetic heads mounted on a rotating drum for recording the conventional video signal in slant tracks across the width of the 8 mm tape such that an entire field of color video signal is recorded in each track. As shown in FIG. 2A a segment of magnetic tape 25 has recorded thereon a plurality of recording tracks 27. Since a frame of video in the NTSC system has two interlaced fields, a field of video is recorded on each track and two tracks 27A and 27B are used to record the two fields of a single frame of video.

Figure 2B:
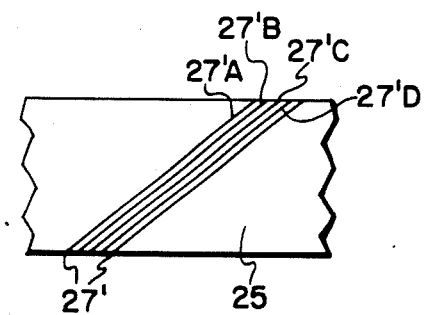
Figure 3C:
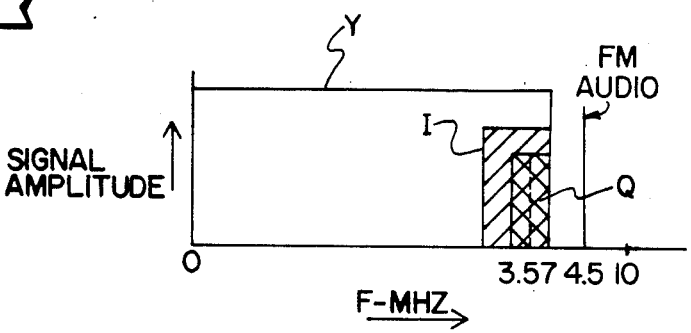

A TDM full bandwidth signal may also be recorded on magnetic tape 25 at the option of the operator. The TDM signal is recorded on magnetic tape which is moved at twice the speed used in recording the conventional format video signal, the magnetic record heads being rotated at twice the rotational speed used in conventional recording. In this manner, whereas a single field of a frame is recorded on a single track across the width of the tape in conventional format recording, in the TDM format a single field is recorded on two adjacent tracks. Thus, as shown in FIG. 2B four tracks are used for recording the two fields of a video frame, tracks 27'A and 27'B for recording the first field of a frame, and tracks 27'C and 27'D for recording the second field of the video frame.

Figure 3B:
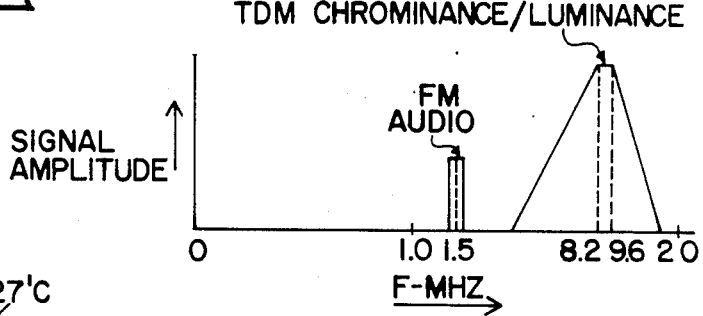

When switch 26 (FIG. 1) is actuated by button 36 on control 28, the composite video signal from source 12 is presented to TDM record circuit 22. Circuit 22 reformats the composite video signal into a TDM signal (FIGS. 3B and 6A). The time-division-multiplex format (which will be explained in greater detail later) time compresses the Y luminance and I and Q chrominance components as well as the sync signal of a line of color video signals, and arranges each TDM signal during a different time period of the line. As shown in FIG. 6A, a line of color video signals has been reformatted into a compressed sync 38, compressed I and Q chrominance components 39 and 40, a compressed Y luminance component 41 and buffers 42 and 43. The TDM signal is frequency modulated on a carrier which is higher in frequency than the carrier used for the luminance signal in the conventional format. In the TDM format, substantially the full signal bandwidths of the composite video signal are processed and both the luminance and chrominance component signals are frequency modulated. However, to maintain compatibility with the conventional format video signal, the audio signal is frequency modulated on the same carrier (1.5 MHz) as in the conventional format.

Either the conventional format video signal or the TDM format video signal is applied (FIG. 1) by means of switch 46 and record/playback switch 48, to a magnetic transducer including magnetic heads 50 and 52 mounted on a head drum 54 rotated by drum motor 56. Magnetic tape 25 is moved past drum 54 at a constant speed by means of pinch roller 57 and capstan 58, the capstan being rotated by means of capstan motor 60.

In the conventional format mode, capstan motor drive 62 causes motor 60 to rotate capstan 58 at a speed so as to move tape 25 along a path past drum 54 at a first tape speed, a drive 64 causing motor 56 to rotate drum 54 at a first rotational speed of 1,800 rpm. When the TDM format video signal is recorded on tape 25, capstan motor drive 62 causes motor 60 to rotate capstan 58 at a speed so as to move tape 25 past drum 54 at a second tape speed which is twice the conventional format tape speed. At the same time, drum drive 64 causes drum motor 56 to rotate drum 54 at a rotational speed which is twice the rotational speed of the conventional format recording, i.e. 3,600 r.p.m.

Switching is effected between heads 50 and 52 by means of head switch 66 which is actuated by pulse generator (PG) 68 rotated at the same speed as drum 54. In this manner, the video signal is alternately supplied to one of heads 50, 52 for recording on tape 25.

In the playback mode, switch 48 is actuated by button 32 on control 28 to supply video signals from tape 25 to playback circuit 18 or 24. Depending upon whether conventional format video information or TDM format video information has been recorded on tape 25, switches 70 and 72 will be actuated to permit processing of the selected format. Again, depending upon the format of the signal recorded on tape 25, drives 62 and 64 will be set to drive motors 60 and 62 and consequently capstan 58 and head drum 54 respectively at either the conventional format speeds or at the doubled TDM format speeds. Playback circuits 18 and 24 process the respective signals applied to them into an NTSC composite video signal which is applied to monitor 74 for display.

Apparatus 10 includes a signal generator 76 which produces sampling signals $F_1$-$F_4$. TDM control circuit 78 produces timing control signals $C_1$-$C_8$ (see FIG. 7). Signals $F_1$-$F_4$ and $C_1$-$C_8$ are applied to TDM circuits 22 and 24 to effect processing of the TDM signal according to the present invention.

Figure 4:
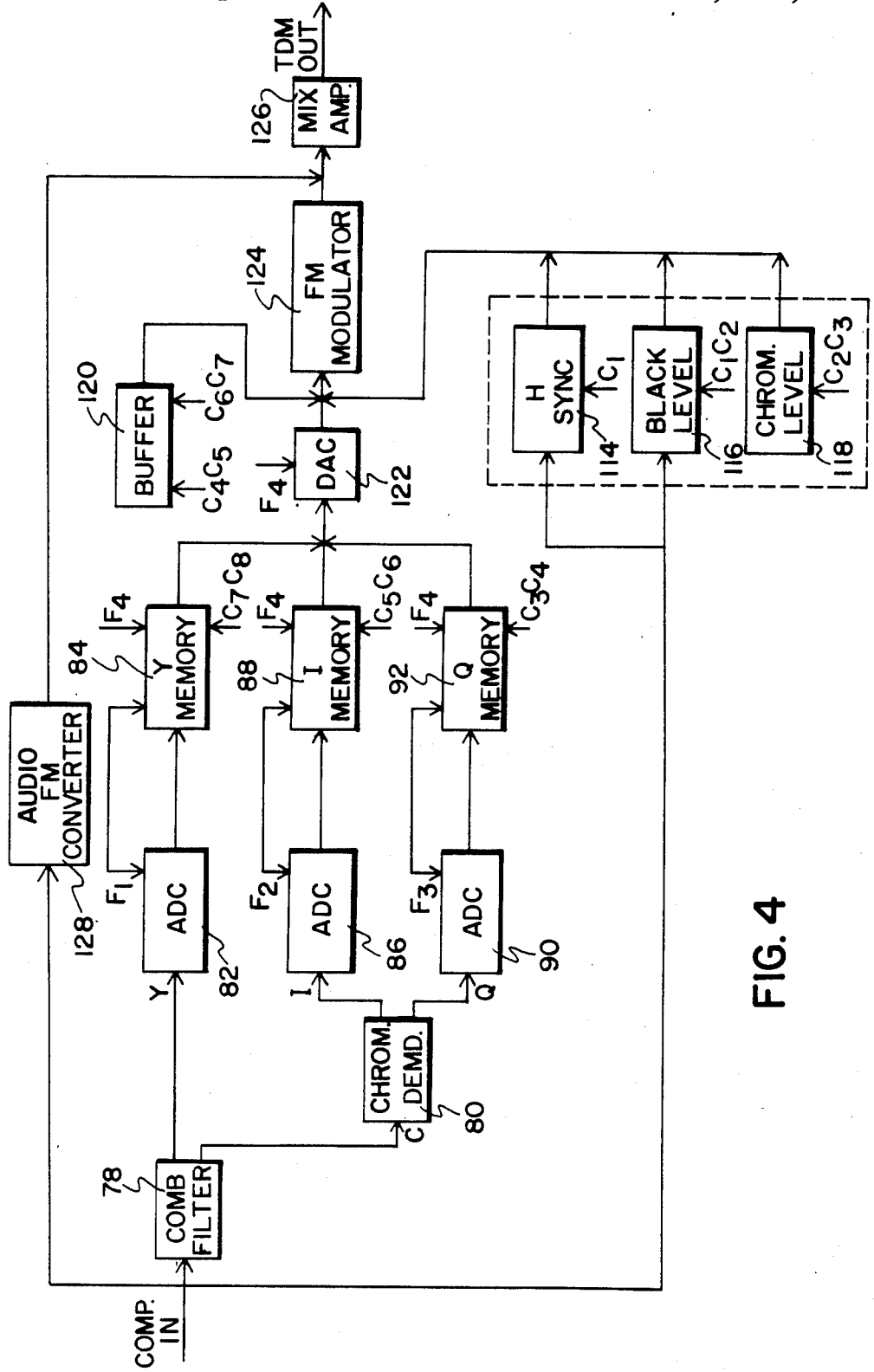
FIG. 4 is a block diagram of the TDM record circuit of the apparatus of FIG. 1.
Figure 5:
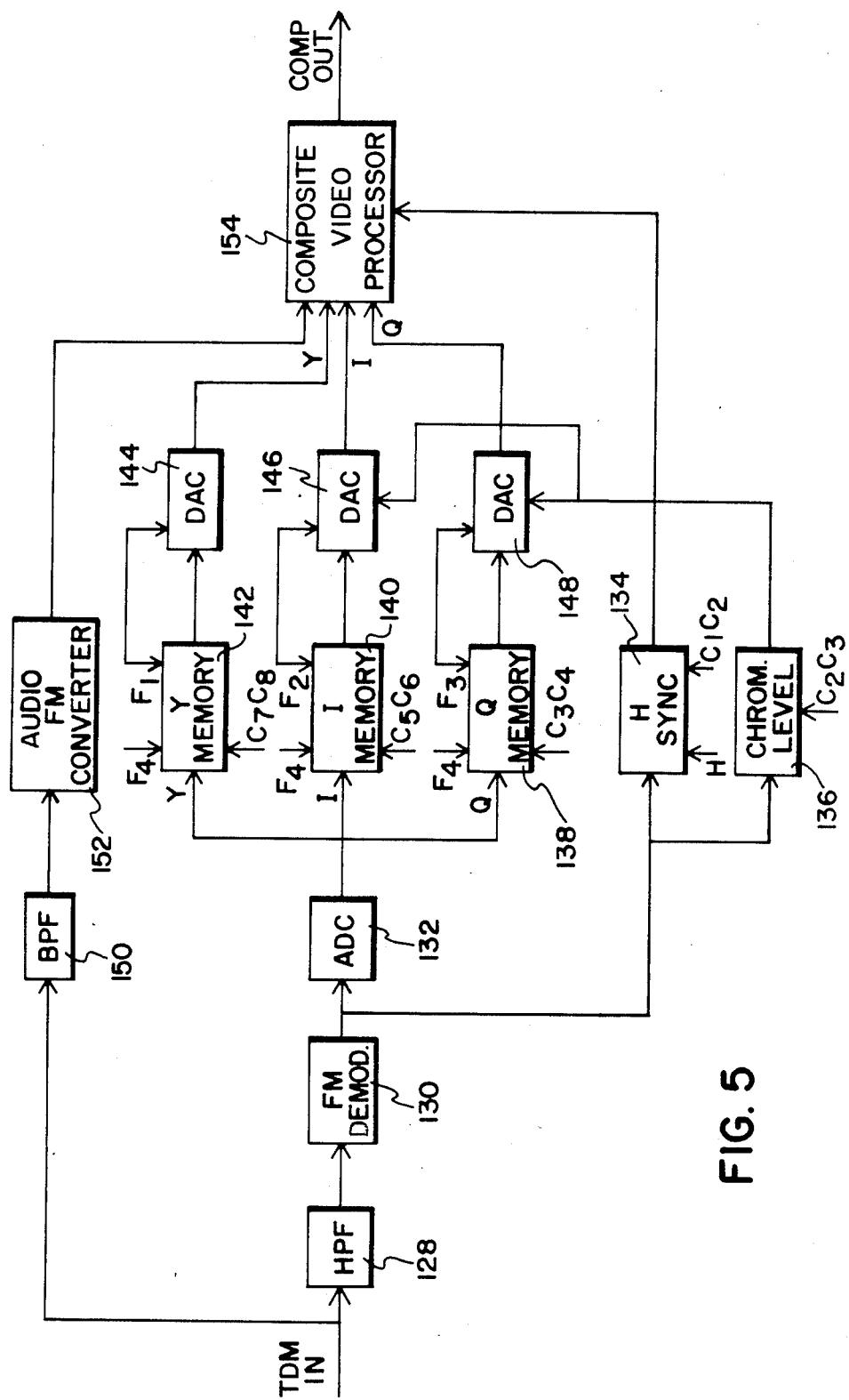
FIG. 5 is a block diagram of the TDM playback circuit of the apparatus of FIG. 1.

Referring now to FIG. 4, there is shown in greater detail TDM record circuit 22. As shown, the composite video signal which has been supplied by video signal source 12 through switch 26 is applied to a comb filter 78 which separates out the Y luminance and C chrominance components of the video signal. A chrominance demodulator 80 demodulates the C chrominance signal into I and Q chrominance components. The Y, I and Q analog signals are supplied to respective analog-to-digital (ADC) converters 82, 86, and 90. Sampling signals $F_1$, $F_2$ and $F_3$ are respectively applied to ADC 82, ADC 86 and ADC 90 to effect sampling of the Y, I and Q components at respective illustrative frequencies of 14.097 MHz, 4.027 MHz, and 2.013 MHz. These frequencies are more than twice the respective highest frequency signals of each video component signal in order to satisfy the sampling theory. The digital Y, I and Q signals are respectively read into Y memory 84, I memory 88 and Q memory 92 at the sampling frequencies of sampling signals $F_1$, $F_2$, and $F_3$.

Production of the TDM signal according to the present invention may be explained by reference to FIGS. 6A, 6B, 6C, and 6D. As described above, a composite color video signal having the duration of a horizontal line is processed into a time-division-multiplex signal in which the various video components are compressed in time and arranged in a time sequential manner. The respective TDM signals have durations which are a function of the sampling period of the frequency of the sampling signal $F_4$ used to time compress the Y, I and Q video signal components. In the present example, $F_4$ is chosen to have a sampling frequency of 1152 $f_H$ or 18.125 MHz. Each of the TDM signals 38, 39, 40, 41, 42, and 43 has a duration which is an integral multiple of the sample period (1/1152 $f_H$). Moreover, according to the present invention, each TDM signal duration is divisible by the same number greater than 1 which is preferably an integer.

As shown in FIGS. 6B and 6C, the TDM signal of FIG. 6A has a duration of a horizontal line or of 1152 sample period of time compression sampling signal $F_4$. Thus, the sync 38 has a duration from $t_0$ to $t_3$ (from 0 to 54 sample period count), the compressed Q component 39 has a duration from $t_3$ to $t_4$ (from 54 to 162 sample period count), buffer 40 has a duration from $t_4$ to $t_5$ (from 162 to 171 sample period count), compressed I component 41 has a duration from $t_5$ to $t_6$ (from 171 to 387 sample period count), and compressed Y component 43 has a duration from $t_7$ to $t_8$ (from 396 to 1152 sample period count). According to the present invention, the respective durations of the TDM signals are divisible by the same number greater than 1. In the illustrative example, each TDM signal duration is divisible by 9 so that the timing circuit for processing the TDM signal is slower, less complex and less costly. As shown in FIG. 6D, the timing frequency is equal to 1/9 of 1152 $f_H$ or 128 $f_H$ and the line period is divided into 128 timing periods. Thus, sync 38 has a duration from 0 to 6 timing period count, compressed Q component 39 has a duration from 6 to 18 timing period count and so on.

As shown in FIG. 8, sync 38 is preferably formed of a compressed H sync 38A which is a function of the H sync of the composite video signal; a black level signal 38B which is a function of the black level of the composite video signal; and a chrominance level signal 38C which is a function of the average of the white and black levels of the composite video signal. Each of 38A, 38B and 38C has a duration which is an integral multiple of the period of sampling frequency $F_4$ and which is divisible by the counting factor 9. This is shown in FIGS. 6A-6D.

Figure 7:
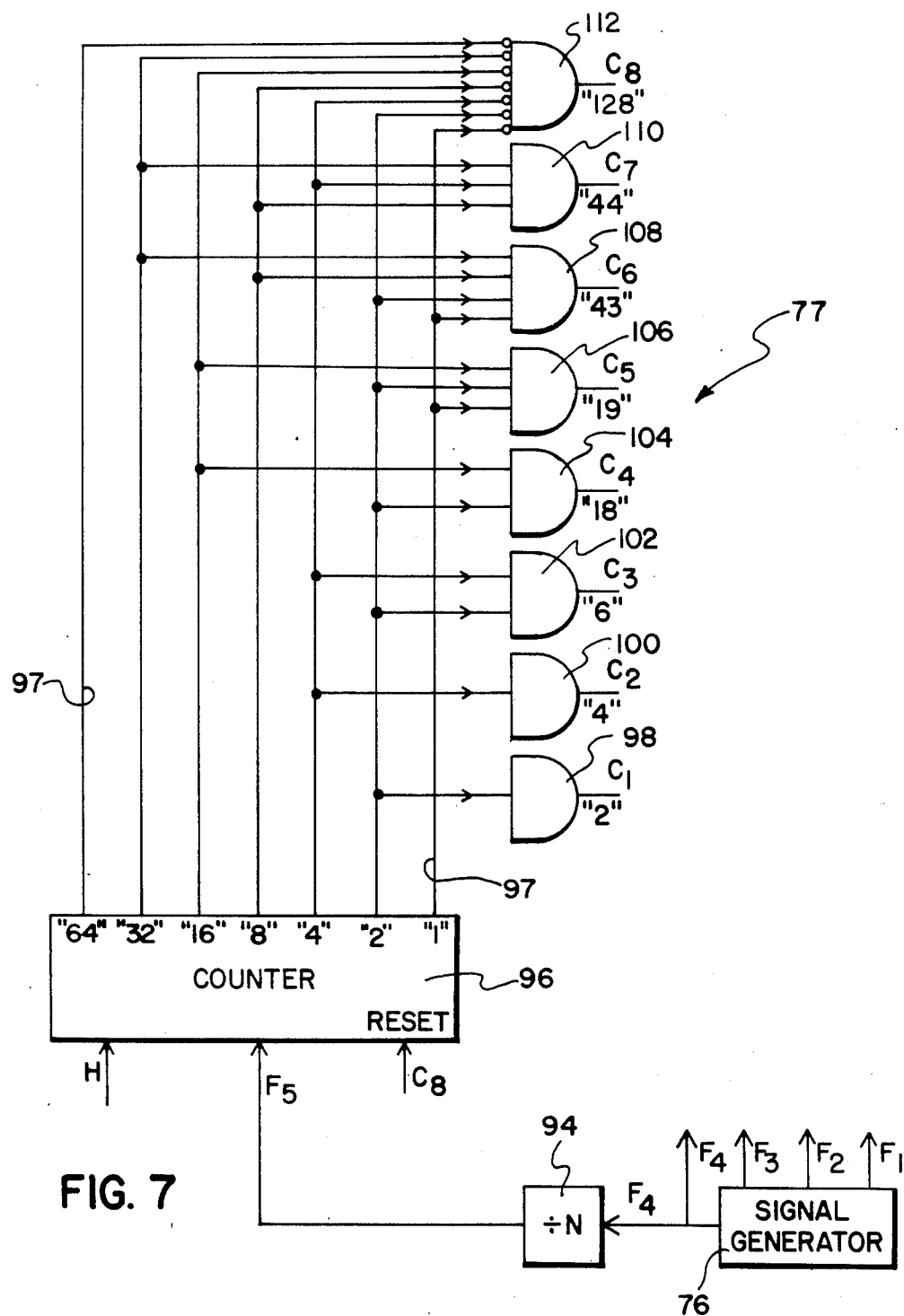
FIG. 7 is a schematic diagram of the control circuit of the apparatus of FIG. 1.

Timing of the TDM signal processing is provided by TDM control circuit 77 shown in detail in FIG. 7. Circuit 77 includes a divided by N circuit 94 which divides the frequency of sampling signal $F_4$ by N (e.g. by 9) to provide counting signal $F_5$. Signal $F_5$ is applied to a 7 bit counter which has seven output terminals 97 designated "1", "2", "4", "8", "16", "32", "64". Terminals 97 are selectively connected to a series of AND gates 98, 100, 102, 104, 106, 108, 110, and 112 which respectively produce control signals $C_1$-$C_8$ at time $t_1$-$t_8$ of the TDM signal.

Referring again to FIG. 4, after a suitable delay to permit writing of the Y, I and Q components into respective memories 84, 88, and 92, the leading edge of the delayed H sync starts counter 96 counting from time $t_0$, for a horizontal line. From time $t_0$ to time $t_1$ the compressed H sync signal 38A is produced by circuit 114. At time $t_1$ control signal $C_1$, produced by AND gate 98, terminates production of signal 38A by circuit 114 and initiates production of signal 38B by black level circuit 116. At time $t_2$ AND gate 100 produces control signal $C_2$ which terminates the production of black level signal 38B, and initiates the production of chrominance level signal 38C by circuit 118. At time $t_3$, the production of signal 38C is terminated by control signal $C_3$ from AND gate 102 and the samples of the Q chrominance component are read out of Q memory 92 at the sampling frequency $F_4$. Compressed Q component 39 is terminated at time $t_4$ by control signal $C_4$ produced by AND gate 104. Buffer 40 extends from $t_4$ to $t_5$ when it is terminated by control signal $C_5$ produced by AND gate 106.

At $t_5$, control signal $C_5$ is also applied to I memory 88 to initiate reading out of samples of the I component from memory 88 at the sample frequency $F_4$. The compressed I component 40 is terminated at time $t_6$ by the control signal $C_6$ produced by AND gate 108. Control signal $C_6$ is also applied to buffer circuit 120 to produce a buffer 42 between times $t_6$ and $t_7$. At time $t_7$, control signal $C_7$ is produced by AND gate 110 to terminate buffer 42 and to initiate the reading out of compressed Y samples at a frequency $F_4$ and memory 84. Compressed Y component 43 is terminated at $t_8$ at the end of the horizontal line by a control signal $C_8$ produced by gate 112. Counter 96 is also reset to zero by $C_8$.

The digital samples of the compressed Q, I and Y components respectively read out of memories 92, 88, and 84 are converted to analog signals by digital to analog converter 122 at the sampling frequency $F_4$. The respective compressed components 39, 41 and 43, the compressed sync 38, and the buffers 40 and 42 are combined and modulated on an FM carrier by FM modulator 124. The FM modulated signal is then mixed by mixing amplifier 126 with a delayed audio signal which has been converted to a lower frequency by audio FM converter 128. This combined signal is then fed to heads 50 and 52 for recording on tape 25.

Referring now to FIG. 5, there is shown in greater detail TDM playback circuit 24. As shown, the TDM signal, which is played back from tape 25, is applied to a high pass filter (HPF) 128 which passes only the TDM FM modulated signal. FM demodulator 130 demodulates the TDM signal which is applied to analog to digital converter (ADC) 132 and to H sync circuit 134 and chrominance level circuit 136. TDM control circuit 77 (FIG. 7) is initiated by the leading edge of the compressed H sync 38A which initiates the start of counter 96 at time $t_0$. Circuit 134 reconstructs the composite NTSC sync and blanking signal from signals 38A and 38B which is delayed a sufficient time to allow reconstruction of the Y, I and Q components of the composite video signal. During $t_2$ to $t_3$, the chrominance level signal 38C is detected by chrominance level circuit 136, such signal being applied to control the level of the I and Q chrominance components of the composite video signal. At time $t_3$, control signal $C_3$ initiates the reading into Q memory 138 of compressed Q component 39 at the sampling frequency $F_4$. At $t_4$ control signal $C_4$ terminates the reading in of Q memory samples and during the buffer 40, no samples are read into memory. From $t_5$ to $t_6$, control signals $C_5$ and $C_6$ cause the reading into I memory 140 of the samples of compressed I component 41 at frequency $F_4$. During buffer 42 extending from time $t_6$ to time $t_7$ no samples are read into memory. However, at time $t_7$, control signal $C_7$ initiates the reading into Y memory 142 of the time compressed samples of compressed Y component 43 at the frequency $F_4$.

After the final sample has been read into Y memory 142, circuit 134 is initiated to produce the composite H sync signal which has a duration of approximately 10.2 msec. Thereafter, the Y, I and Q memories 142, 140, and 148 are initiated simultaneously or with appropriate delays to read out the expanded Q component from Q memory 138 at a frequency $F_3$, the expanded I component from I memory 140 at a frequency $F_2$, and the Y component from the Y memory 142 at a frequency $F_1$. The Y, I and Q digital samples are applied respectively to digital to analog converters (DAC) 144, 146, and 148 to which the respective frequencies $F_1$, $F_2$, and $F_3$ are also applied. The chrominance level detected by circuit 136 is applied to DAC 146 and DAC 148 to control the chrominance level of the expanded chrominance component signals.

The TDM signal has also been applied to band pass filter 150 to pass the FM audio signal to audio FM converter 152 which converts the audio signal upward to the broadcast audio frequency of 4.5 MHz. The H sync and blanking signals, the audio signal and the Y, I and Q video component signals are then combined in composite video modulator 154 to produce the standard NTSC composite signal.

Thus, it is seen that the TDM timing and control circuit of FIG. 7 operates at a substantially slower speed at frequency $F_5$ than would be necessary if the higher sampling frequency $F_4$ were used. This permits the use of less expensive and simpler components with lower tolerances, thus lowering the complexity and cost of a video cassette recorder utilizing the TDM mode described hereinabove. It will be appreciated that although specific compression and expansion sampling frequencies have been set forth above, other appropriate frequencies may be used. It will also be appreciated that although the specific frequencies illustrated above are appropriate to the NTSC system, different sampling frequencies may be appropriate for other video systems such as the PAL or SECAM systems used in other parts of the world.

The invention has been described in detail with particular reference to preferred embodiments thereof, but it will be understood that variations and modifications can be effected within the spirit and scope of the invention.

What is claimed is:

1. Video signal apparatus comprising:
   circuit means for producing from a color video signal having a sync signal portion including a sync signal and a video portion including concurrent luminance and chrominance component signals, a time-division-multiplex (TDM) video signal including a compressed sync signal which has a duration less than said sync signal of said color video signal, a compressed chrominance component constituting a series of time compressed samples of equal sample duration of the chrominance component of said composite color video signal, a compressed luminance component constituting a series of time compressed samples of equal sample duration of the luminance component of said composite color video signal and a buffer between the compressed chrominance component and the compressed luminance component; and
   control means for controlling said circuit means so that the duration of each of said compressed sync signal, said compressed chrominance component, said compressed luminance component and said buffer of said TDM signal is equal to an integral multiple of said sample duration and each said TDM signal duration is divisible by the same integral number greater than one.

2. The apparatus of claim 1 wherein said control means includes means for generating a sampling signal having a frequency F and wherein said sampling signal is applied to said circuit means (1) to produce said compressed chrominance and luminance components with samples having a duration 1/F and (2) to produce said compressed sync and said buffer having a duration so as to have respective durations which are an integral multiple of the sample duration 1/F.

3. The apparatus of claim 1 wherein said circuit means produces said compressed chrominance component comprising two separate compressed chrominance components of said color video signal and wherein said control means controls said circuit means so that the duration of each of said compressed sync, signal buffer, two compressed chrominance components and compressed luminance component is integrally divisible by said number.

4. Time-division-multiplex (TDM) video signal apparatus comprising:
   means for providing a color video signal having a sync signal portion, and a video portion having a chrominance component signal, and a luminance component signal concurrent in time with said chrominance component signal;
   circuit means coupled to said providing means for producing, from said color video signal, a TDM color video signal having in time sequential order, a compressed sync signal, a compressed chrominance component signal, a first buffer and a compressed luminance component signal wherein each of said compressed chrominance and luminance component signals constitute a series of time-compressed samples of equal sample duration; and control means for controlling said circuit means so that the durations of said compressed sync signal, said compressed chrominance component signal, said buffer and said compressed luminance component signal respectively of said TDM color video signal are equal to an integral multiple of said sample duration and each such TDM signal duration is divisible by the same integral number greater than one.

5. The apparatus of claim 4 wherein said providing means provides said color video signal having said chrominance component signal comprising separate first and second chrominance component signals;

wherein said circuit means produces said TDM video signal having said compressed chrominance component signal comprising in time sequential order a compressed first chrominance component signal, a second buffer, and a compressed second chrominance component signal, and wherein said compressed first and second chrominance component signals constitute a series of time-compressed samples of said equal sample duration; and wherein said control means controls the duration, respectively, of said compressed sync, of said compressed first component signal, of said first buffer, of said compressed second chrominance component signal, of said second buffer and of said second compressed luminance component signal of said TDM signal so that each such duration is equal to an integral multiple of said sample duration and is divisible by the same integral number greater than one.

6. The apparatus of claim 4 wherein said compressed sync signal includes a compressed H sync signal, a compressed black level signal and a compressed chrominance level signal which is a function of the black and white levels of the color video signal, whereby the duration of each of said signals (1) is an integral multiple of said sample duration and (2) is divisible by said integral number greater than one.

7. The apparatus of claim 6 wherein said H sync signal, said black level signal and said chrominance level signal are equal in duration.

* * * * *